United States Patent
Fukawatase et al.

(10) Patent No.: US 8,931,800 B2
(45) Date of Patent: Jan. 13, 2015

(54) AIRBAG DEVICE FOR FRONT PASSENGER'S SEAT

(71) Applicants: Osamu Fukawatase, Miyoshi (JP); Makoto Ozeki, Toyota (JP)

(72) Inventors: Osamu Fukawatase, Miyoshi (JP); Makoto Ozeki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/024,127

(22) Filed: Sep. 11, 2013

(65) Prior Publication Data

US 2014/0091561 A1    Apr. 3, 2014

(30) Foreign Application Priority Data

Sep. 28, 2012   (JP) ................. 2012-218123

(51) Int. Cl.
 *B60R 21/16*    (2006.01)
(52) U.S. Cl.
 USPC ........................................................ 280/732
(58) Field of Classification Search
 USPC .................... 280/728.3, 732, 730.1
 See application file for complete search history.

(56) References Cited

U.S. PATENT DOCUMENTS

| | | | |
|---|---|---|---|
| 5,135,253 A | | 8/1992 | Hirashima et al. |
| 5,348,343 A * | | 9/1994 | Hawthorn ................ 280/730.1 |
| 6,042,144 A * | | 3/2000 | Murakami et al. ............ 280/732 |
| 6,322,101 B1 | | 11/2001 | Suizu et al. |
| 6,499,765 B2 * | | 12/2002 | Hawthorn et al. ......... 280/743.1 |
| 6,607,210 B2 * | | 8/2003 | Eckert et al. .................. 280/732 |
| 6,616,182 B2 * | | 9/2003 | Woolley et al. ............... 280/732 |
| 6,942,242 B2 * | | 9/2005 | Hawthorn et al. .......... 280/728.2 |
| 7,487,994 B2 * | | 2/2009 | Okada et al. ................... 280/732 |
| 2001/0007391 A1 * | | 7/2001 | Hamada et al. ............ 280/743.2 |
| 2005/0110249 A1 | | 5/2005 | Hasebe et al. |
| 2009/0194982 A1 | | 8/2009 | Yamauchi et al. |

FOREIGN PATENT DOCUMENTS

| | | |
|---|---|---|
| JP | H02-310140 A | 12/1990 |
| JP | H03-108565 U | 11/1991 |
| JP | H05-80920 U | 11/1993 |
| JP | H06-135294 A | 5/1994 |
| JP | H07-291072 A | 11/1995 |
| JP | H11-170953 A | 6/1999 |

(Continued)

OTHER PUBLICATIONS

Japanese Office Action dated Sep. 24, 2014, issued in corresponding Japanese Patent Application 2012-218123 (4 pages).

*Primary Examiner* — Faye M. Fleming
(74) *Attorney, Agent, or Firm* — Gifford, Krass, Sprinkle, Anderson & Citkowski, P.C.

(57) ABSTRACT

An airbag device for a front passenger's seat includes an airbag module and an instrument panel. The airbag module is provided in front of a front passenger's seat of a vehicle, and inflates and expands an airbag with gas jetted out by an inflator. The instrument panel includes an upper wall portion that covers the airbag module from the upper side. An aperture is formed in the upper wall portion by opening of an airbag door by inflation pressure of the airbag, and the airbag inflates toward an upward side and a vehicle rearward side from the aperture. A forward support surface is provided at the upper wall portion. The forward support surface supports the airbag inflating from the aperture from the vehicle forward side thereof, and is inclined such that a normal line of the forward support surface turns to the downward side further toward the vehicle rearward side.

17 Claims, 5 Drawing Sheets

(56) References Cited

FOREIGN PATENT DOCUMENTS

| | | |
|---|---|---|
| JP | 2005-153668 A | 6/2005 |
| JP | 2005-254882 A | 9/2005 |
| JP | 2012-56370 A | 3/2012 |
| JP | 4946899 B2 | 6/2012 |

* cited by examiner

AIRBAG DEVICE FOR FRONT PASSENGER'S SEAT

CROSS-REFERENCE TO RELATED APPLICATION

This application claims priority under 35 USC 119 from Japanese Patent Application No. 2012-218123, the disclosure of which is incorporated by reference herein.

BACKGROUND

1. Technical Field

The present invention relates to an airbag device for a front passenger's seat, and particularly relates to an airbag device for a front passenger's seat that is equipped with a top mount-type airbag module.

2. Related Art

In an airbag device for a front passenger's seat recited in Japanese Patent No. 4,946,899, a top mount-type airbag module is disposed below an upper wall portion of an instrument panel. In this airbag module, the airbag is inflated with gas that is jetted out by an inflator, an airbag door provided in the upper wall portion of the instrument panel is opened by inflation pressure from the airbag, and the airbag is inflated upward through an aperture formed in the upper wall panel by the opening of the airbag door. The airbag that is inflated to the upper side of the instrument panel abuts against a windshield, inflates and expands toward the vehicle rearward side, and restrains a passenger while being supported by the windshield.

However, in a vehicle in which the roof is set lower or the like with a view to improving fuel economy or the like, the upper wall portion of the instrument panel is in some cases set to a lower position. In this kind of vehicle, the installation position of a top mount-type airbag module may be set to a low position that is further downward from the windshield. In this case, for the inflated and expanded airbag to abut against and be supported by the windshield, the volume of the airbag needs to be increased, and the expansion speed of the airbag may be slowed. Moreover, it is more difficult to make support of the airbag by the windshield stable, and the airbag may be more susceptible to being pushed in toward the vehicle forward side when restraining a passenger. Thus, there is scope for improvement in the matter of making passenger restraint performance by an airbag excellent.

In consideration of the circumstances described above, an object of the present invention is to provide an airbag device for a front passenger's seat that may make passenger restraint performance by the airbag excellent even when an installation position of a top mount-type airbag module is low.

SUMMARY

An airbag device for a front passenger's seat relating to a first aspect of the present invention includes: an airbag module that is provided in front of a front passenger's seat of a vehicle, the airbag module inflating and expanding an airbag with gas that is jetted out by an inflator; and an instrument panel that includes an upper wall portion that covers the airbag module from an upper side thereof, the airbag inflating toward an upward side and a vehicle rearward side from an aperture that is formed in the upper wall portion by opening of an airbag door by inflation pressure of the airbag, and a forward support surface being provided at the upper wall portion, which forward support surface supports the airbag inflating from the aperture from a vehicle forward side thereof and is inclined such that a normal line of the forward support surface turns to a downward side further toward the vehicle rearward side.

In the first aspect of the present invention, the airbag module provided in front of the front passenger's seat of the vehicle is covered from the upward side by the upper wall portion of the instrument panel. This airbag module inflates and expands the airbag with gas that is jetted out by the inflator. At this time, the airbag is inflated to the upward side and toward the vehicle rearward side through the aperture that is formed in the upper wall portion of the instrument panel by the airbag door being opened by the inflation pressure of the airbag. Thus, this airbag module is a top mount-type airbag module.

According to the present invention, the airbag inflated through the aperture in the upper wall portion as described above is supported from the vehicle forward side by the forward support surface that is provided at the upper wall portion of the instrument panel. The forward support surface is inclined such that the normal line thereof turns to the lower side further toward the vehicle rearward side. Therefore, the gas jetted out from the inflator interferes with the forward support surface, via the airbag. Thus, the flow of gas may be turned to the vehicle rearward side (the passenger side). As a result, the airbag may be rapidly inflated and expanded toward the passenger side.

Furthermore, because the airbag is supported by the forward support surface, an amount by which the airbag is pushed in toward the vehicle forward side when restraining a passenger may be reduced. In addition, because inflation of the airbag toward the vehicle forward side may be restrained, the volume of the airbag may be made smaller and the expansion speed of the airbag may be made quicker.

Due thereto, with the present invention, passenger restraint performance by the airbag may be made excellent even when an installation position of the top mount-type airbag module is low.

The airbag device for a front passenger's seat relating to the first aspect of the present invention may be configured such that the upper wall portion is formed in a stepped shape in which an upper step wall portion at the vehicle forward side and a lower step wall portion at the vehicle rearward side are joined by an inclined wall portion, and the forward support surface is provided at the inclined wall portion.

In the structure described above, the upper wall portion of the instrument panel is formed in the stepped shape in which the upper step wall portion at the vehicle forward side and the lower step wall portion at the vehicle rearward side are connected by the inclined wall portion. Therefore, for example, a display or the like may be disposed at an upper face of the lower step wall portion, and a novel appearance may be provided. In addition, because the forward support surface that supports the airbag is provided at the inclined wall portion that connects the upper step wall portion with the lower step wall portion, there is no need to specify a particular shape for the upper wall portion of the instrument panel in order to provide the forward support surface, which is favorable.

The airbag device for a front passenger's seat relating to the first aspect of the present invention may be configured so as to include a sideward support surface that is provided at at least one of the instrument panel or a door trim of a side door, the sideward support surface supporting the airbag inflating from the aperture from a vehicle width direction outer side thereof.

In the structure described above, the airbag that is inflated through the aperture in the upper wall portion of the instrument panel by the gas jetted out by the inflator is supported from the vehicle forward side by the forward support surface provided at the upper wall portion and is supported from the vehicle width direction outer side by the side support surface that is provided at one or both of the instrument panel and the door trim of a side door. Therefore, the support of the airbag when restraining a passenger may be made even more stable. In particular, when a vehicle width direction outer side portion relative to a front side member of the vehicle collides with a collision object (when there is a "small overlap crash"), the upper body of a passenger moves diagonally forward due to inertia in association with a displacement to the vehicle width direction outer side, and the airbag slants in the direction of movement of the passenger. However, with the present invention this slanting of the airbag may be suppressed. Moreover, inflation of the airbag to the vehicle width direction outer side may be suppressed by the airbag being supported by the sideward support surface. Thus, the volume of the airbag may be made even smaller, which may contribute to rapid inflation and expansion of the airbag.

In the airbag device for a front passenger's seat relating to the invention described above that includes the sideward support surface, the sideward support surface may be formed such that the sideward support surface is inclined such that a normal line thereof turns to the downward side further toward the vehicle width direction inner side, is curved so as to form a shape projecting to the vehicle width direction outer side as viewed from the vehicle front-and-rear direction, and is formed so as to follow an outer profile of the airbag in a state in which inflation and expansion is complete.

In the structure described above, because the sideward support surface is formed so as to follow the outer profile of the airbag in the state in which inflation and expansion is complete, the volume of this airbag that is supported by the sideward support surface may be effectively reduced.

In the airbag device for a front passenger's seat relating to the first aspect of the present invention, the forward support surface may be formed such that the forward support surface is curved so as to form a shape projecting to the vehicle forward side as viewed from a vehicle width direction, and is formed so as to follow an outer profile of the airbag in a state in which inflation and expansion is complete.

In the structure described above, the forward support surface provided at the upper wall portion of the instrument panel is inclined such that the normal line turns to the downward side further toward the vehicle rearward side, and is curved so as to protrude to the vehicle forward side as viewed from the vehicle width direction. Therefore, the gas that interferes with the forward support surface via the airbag may be excellently guided toward the vehicle rearward side by the forward support surface. Moreover, because the forward support surface is formed so as to follow the outer profile of the airbag in the state in which inflation and expansion is complete, the volume of this airbag that is supported by the forward support surface may be effectively reduced.

In the airbag device for a front passenger's seat relating to the first aspect of the present invention, the air bag door may be have a pair of doors respectively formed at the front and rear of a tear line, and the front side door abuts the forward support surface when the front side door opens.

In the airbag device for a front passenger's seat relating to the first aspect of the present invention, the inflator may be disposed below the forward support surface, when viewed from the vehicle width direction, at a portion where the inflator overlaps with the forward support surface in the vehicle front-and-rear direction.

An airbag device for a front passenger's seat relating to a second aspect of the present invention includes: an airbag module that is provided in front of a front passenger's seat of a vehicle, the airbag module inflating and expanding an airbag with gas that is jetted out by an inflator; an instrument panel that includes an upper wall portion that covers the airbag module from an upper side thereof, the airbag inflating toward an upward side and a vehicle rearward side from an aperture that is formed in the upper wall portion by opening of an airbag door by inflation pressure of the airbag; and a sideward support surface that is provided at at least one of the instrument panel or a door trim of a side door, the sideward support surface supporting the airbag inflating from the aperture from a vehicle width direction outer side thereof.

In the second aspect of the present invention, the airbag provided in front of the passenger's seat of the vehicle is covered from the upward side by the upper wall portion of the instrument panel. This airbag module inflates and expands the airbag with gas that is jetted out by the inflator. At this time, the airbag is inflated to the upward side and toward the vehicle rearward side through the aperture that is formed in the upper wall portion of the instrument panel by the opening of the airbag door by the inflation pressure of the airbag. Thus, this airbag module is a top mount-type airbag module.

According to the present invention, the airbag inflated through the aperture in the upper wall portion as described above is supported from the vehicle width direction outer side by the sideward support surface that is provided at one or both of the instrument panel or the door trim of a side door. Therefore, an amount by which the airbag is pushed in toward the vehicle width direction outer side when restraining a passenger may be reduced. In addition, because inflation of the airbag toward the vehicle width direction outer side may be restrained, the volume of the airbag may be made smaller and the expansion speed of the airbag may be made quicker.

In the airbag device for a front passenger's seat relating to the second aspect of the present invention, the sideward support surface may be formed such that the sideward support surface is inclined such that a normal line thereof turns to a downward side further toward a vehicle width direction inner side, is curved so as to form a shape projecting to the vehicle width direction outer side as viewed from a vehicle front-and-rear direction, and is formed so as to follow an outer profile of the airbag in a state in which inflation and expansion is complete.

In the structure described above, because the sideward support surface is formed so as to follow the outer profile of the airbag in the state in which inflation and expansion is complete, the volume of this airbag that is supported by the sideward support surface may be effectively reduced.

Due thereto, with the present invention, passenger restraint performance by the airbag may be made excellent even when an installation position of the top mount-type airbag module is low.

Advantageous Effects of Invention

As described hereabove, an airbag device for a front passenger's seat relating to the present invention may make passenger restraint performance by the airbag excellent even when an installation position of a top mount-type airbag module is low.

BRIEF DESCRIPTION OF THE DRAWINGS

Exemplary Embodiments of the present invention will be described in detail based on the following figures, wherein.

DETAILED DESCRIPTION

An airbag device for a front passenger's seat 10 in accordance with an exemplary embodiment of the present invention is described hereinafter using FIG. 1 to FIG. 5. An arrow FR that is shown where appropriate in the drawings indicates the vehicle forward direction, an arrow UP indicates the vehicle upward direction, and an arrow IN indicates a vehicle width direction inward direction. Hereinafter, where descriptions are given simply using the directions front, rear, up and down, unless specifically stated otherwise, these indicate front and rear in the vehicle front-and-rear direction and up and down in the vehicle up-and-down direction.

Structure

Figure 1:
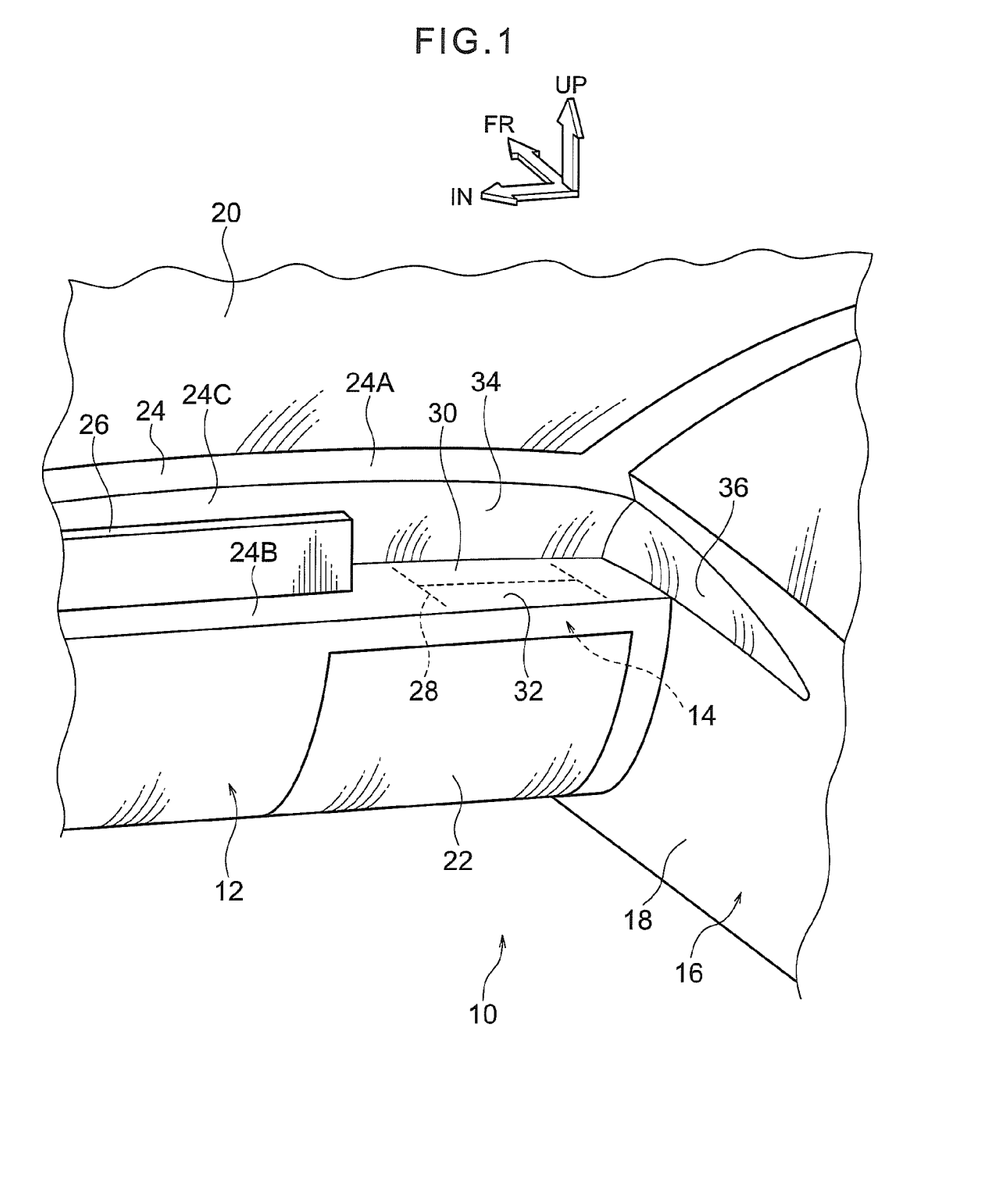
FIG. 1 is a perspective view that shows structures of an instrument panel and peripheral members, including a door trim of a side door, which are structural members of an airbag device for a front passenger's seat relating to an exemplary embodiment of the present invention.
Figure 2:
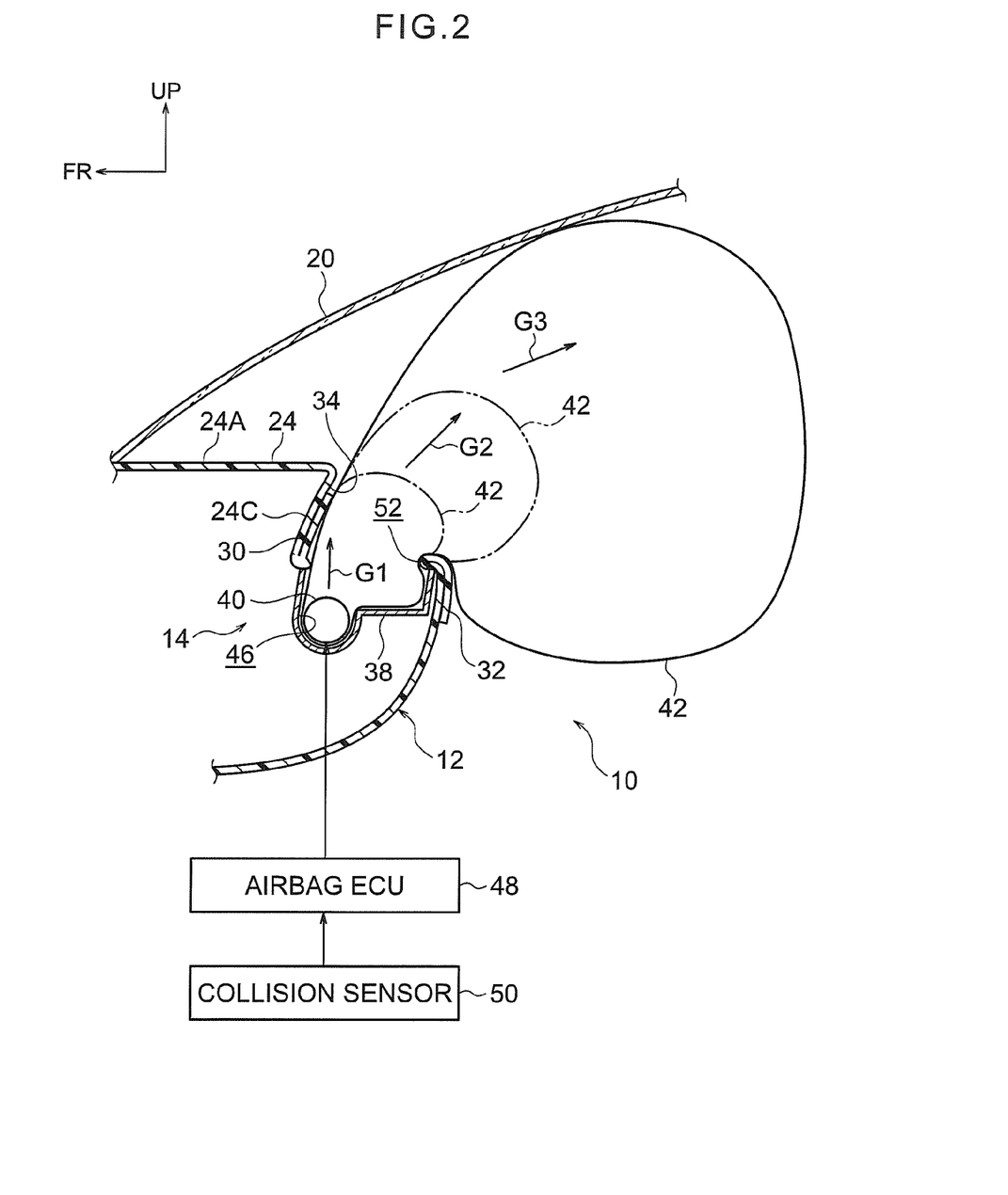
FIG. 2 is a side sectional diagram that shows the structure of the same airbag device for a front passenger's seat, in a state in which the airbag is inflated, viewed from the vehicle width direction.

As shown in FIG. 1 and FIG. 2, the airbag device for a front passenger's seat 10 according to the present exemplary embodiment is structured with an instrument panel 12, a top mount-type airbag module 14, and a door trim 18 of a side door 16 as principal portions. The member marked with the reference numeral 20 in FIG. 1 and FIG. 2 is a windshield, and the member marked with the reference numeral 22 in FIG. 1 is a glove box.

The instrument panel 12 of the present exemplary embodiment is a thin-type instrument panel with a small dimension in the up-and-down direction. With this thin-type instrument panel 12, even if the seating position of a passenger is set lower, a field of view of the passenger in the vehicle forward direction may be assured and space for the feet of the passenger may be kept large. Thus, for example, the roof of the vehicle may be set lower, which is excellent in regard to reducing fuel consumption of the vehicle.

An upper wall portion 24 (top wall portion) of the instrument panel 12 is formed in a stepped shape (the stepped shape being a shelf shape) in which an upper step wall portion 24A at the vehicle forward side and a lower step wall portion 24B at the vehicle rearward side are integrally joined by an inclined wall portion 24C. The lower step wall portion 24B is disposed at the lower side relative to the upper step wall portion 24A, and a display 26 is disposed on the upper face of the lower step wall portion 24B. The display 26 is formed in a long, narrow shape along the vehicle width direction, and is disposed at a vehicle width direction middle portion of the instrument panel 12.

An "H"-shaped tear line 28 is set into a rear face (lower face) of the lower step wall portion 24B, in front of a front passenger's seat, which is not shown in the drawings. Thus, a pair of airbag doors 30 and 32 are provided at the front and rear of the lower step wall portion 24B. The pair of airbag doors 30 and 32 opens to the front and rear when the inflator 40 jets out the gas and the airbag 42 inflates. These airbag doors 30 and 32 correspond with an airbag 42, which is described below. Note that the shape of the tear lines forming the airbag doors is not limited to an "H" shape and may be modified as appropriate.

As shown in FIG. 2, the inclined wall portion 24C of the instrument panel 12 is inclined relative to the up-and-down direction (vertical direction) such that the upper end thereof is disposed at the vehicle rearward side relative to the lower end thereof. Although not shown in the drawings, a slit-shaped air-blowing aperture (an air register) extending in, for example, the vehicle width direction, is provided at an upper end portion of the inclined wall portion 24C. This air-blowing aperture is for blowing air conditioning air that is blown from an air conditioning device for a vehicle into the vehicle cabin, and is formed continuously over substantially the whole of the vehicle width direction of the instrument panel.

A portion of the inclined wall portion 24C of the instrument panel 12 that is disposed in front of the front passenger's seat serves as a forward support surface 34. Similarly to the inclined wall portion 24C, the forward support surface 34 is inclined relative to the up-and-down direction such that the upper end thereof is disposed at the vehicle rearward side relative to the lower end thereof. The forward support surface 34 is inclined such that a normal line thereof turns more to the lower side further toward the vehicle rearward side. The forward support surface 34 is formed as a curved surface that curves in a circular arc shape forming a shape projecting to the vehicle forward side as viewed from the vehicle width direction. The front side of the forward support surface 34 is disposed close to the vehicle forward side of the airbag door 30.

As shown in FIG. 1, a sideward support surface 36 is provided at an upper portion of the door trim 18 of the side door 16. The sideward support surface 36 extends toward the vehicle rearward side from the vicinity of a vehicle width direction outer side end portion of the forward support surface 34. The sideward support surface 36 is inclined with respect to the up-and-down direction (vertical direction) such that the upper end thereof is disposed at the vehicle width direction inner side relative to the lower end thereof, and is inclined such that a normal line thereof turns more to the lower side further toward the vehicle width direction inner side.

The sideward support surface 36 curves in a circular arc shape that forms a shape projecting to the vehicle width direction outer side as viewed from the vehicle front-and-rear direction. Further, the sideward support surface 36 is formed as a curved surface that curves so as to form a shape projecting to the vehicle width direction outer side in the plan view shown in FIG. 5, and is slanted with respect to the vehicle front-and-rear direction so as to approach the vehicle width direction outer side toward the vehicle rearward side.

The airbag module 14 is disposed in front of the front passenger's seat, and is covered from the vehicle cabin interior side by the instrument panel 12. In the present exemplary embodiment, because the instrument panel 12 is a thin-type instrument panel as mentioned above, the airbag module 14 is disposed at a lower position than in an ordinary vehicle where an instrument panel is not a thin-type instrument panel. The airbag module 14 is structured with an airbag case 38, an inflator 40 (a gas generating device), and the airbag 42 as principal portions.

The airbag case 38 is a box body that is formed of a material such as plate metal or the like. The airbag case 38 is disposed below the aforementioned airbag doors 30 and 32, and is covered from the upper side by the lower step wall portion 24B of the upper wall portion 24. The airbag case 38 is supported, via a bracket, at a reinforcing member such as an instrument panel reinforcement or the like, which is not shown in the drawings. An upper end opening portion of the airbag case 38 is closed off by the airbag doors 30 and 32. The airbag case 38 is formed such that a front portion side thereof is deeper than a rear portion side. An inflator accommodation chamber 46 is formed in the airbag case 38, in the bottom wall portion at the front portion side thereof. The inflator accommodation chamber 46 opens to the upper side thereof. An inner periphery face of the inflator accommodation chamber 46 is formed in a circular arc shape as viewed from the vehicle width direction, and the inflator 40 is accommodated in the inflator accommodation chamber 46.

The inflator 40 is, for example, a cylinder-shape gas generating device, and is disposed below the above-mentioned forward support surface 34 when viewed from the vehicle width direction, at a portion where the inflator 40 overlaps with the forward support surface 34 in the vehicle front-and-rear direction. The inflator 40 is structured such that, when the inflator 40 operates, gas is jetted out in a radial pattern from gas jetting-out holes, which are not shown in the drawings. A portion of the gas that is jetted out from the inflator 40 is jetted out directly toward the upper side, and the rest of the gas meets the inner periphery surface of the inflator accommodation chamber 46 (a flow control surface) and is jetted out toward the upper side.

An airbag electronic control unit (ECU) 48 that is mounted in the vehicle is electronically connected to the inflator 40. A collision sensor 50 that detects a front collision of the vehicle is electronically connected to the airbag ECU 48. The airbag ECU 48 and the collision sensor 50 are constituent members of the airbag device for a front passenger's seat 10.

The airbag ECU 48 is structured such that, when the airbag ECU 48 detects a front collision of the vehicle (or that a front collision is unavoidable) on the basis of signals from the collision sensor 50, the airbag ECU 48 passes an operation current through the inflator 40 and causes the inflator 40 to operate. If a pre-crash sensor that predicts (forecasts) front collisions is electronically connected to the airbag ECU 48, the inflator 40 may be operated when the airbag ECU 48 predicts a front collision on the basis of signals from the pre-crash sensor.

The airbag 42 is formed in a bag shape by one or a plural number of panels (base cloths) being sewn together. The panels are formed by, for example, cutting of a fabric based on nylon, polyester or the like. At usual times, the airbag 42 is stowed in the airbag case 38 in a folded-up state.

Now, in the airbag device for a front passenger's seat 10 with the structure described above, when the inflator 40 operates, the gas that is jetted out from the inflator 40 is supplied to the interior of the airbag 42, and the airbag 42 starts to inflate. Correspondingly, inflation pressure in the airbag 42 acts on the airbag doors 30 and 32, the tear line 28 tears and, as shown in FIG. 2, the airbag doors 30 and 32 open to the front and rear. Thus, an aperture 52 is formed in the lower step wall portion 24B of the instrument panel 12, and the airbag 42 inflates toward the upward side through this aperture 52.

Because the forward support surface 34 is provided close to the vehicle forward side of the aperture 52, the airbag 42 inflating through the aperture 52 abuts against the forward support surface 34, via the airbag door 30. Hence, the airbag 42 continues to receive supplies of gas from the inflator 40 and continues to inflate and expand (see the one-dot chain line and the two-dot chain line in FIG. 2) while being supported from the vehicle forward side by the forward support surface 34.

At this time, the gas that is jetted out from the inflator 40 disposed below the forward support surface 34 interferes with the forward support surface 34, via the airbag 42 and the airbag door 30, and the direction of flow changes so as to flow toward the vehicle rearward side (see arrows G1, G2 and G3 in FIG. 2). Thus, this structure promotes inflation and expansion of the airbag 42 toward the vehicle rearward side, that is, toward a passenger sitting on the front passenger's seat.

In the present exemplary embodiment, the sideward support surface 36 is disposed close to the vehicle width direction outer side of the aperture 52, and the airbag 42 inflating through the aperture 52 abuts against the sideward support surface 36. Thus, the airbag 42 is supported from the vehicle width direction outer side by the sideward support surface 36.

In a state in which the inflation and expansion of the airbag 42 is complete, as shown by the solid line in FIG. 2, an upper end portion of the airbag 42 abuts against the windshield 20 and a lower end portion of the airbag 42 is disposed at the lower side relative to the lower step wall portion 24B. An up-and-down direction dimension of the airbag 42 in this inflation and expansion completed state is set to a size capable of restraining, for example, a passenger of a standard body type over a range from the head area to the chest area. A left-and-right direction dimension of the airbag 42 in the inflation and expansion completed state is set, for example, wider than a width dimension of the standard body type passenger.

In the present exemplary embodiment, as described above, the forward support surface 34 is curved in a circular arc shape to form a shape projecting to the vehicle forward side as viewed from the vehicle width direction, and the sideward support surface 36 is curved in a circular arc shape to form a shape projecting to the vehicle width direction outer side as viewed from the vehicle front-and-rear direction. These curved shapes are specified to correspond with the outer profile of the airbag 42 in the inflation and expansion completed state. That is, the forward support surface 34 and the sideward support surface 36 are formed as curved surfaces that are curved so as to follow the outer profile of the airbag 42 in the inflation and expansion completed state.

Operation and Effects

Next, operation and effects of the present exemplary embodiment are described.

In the present exemplary embodiment, when the inflator 40 jets out the gas, the airbag 42 inflates and opens the airbag doors 30 and 32 to the front and rear. Thus, the aperture 52 is formed in the lower step wall portion 24B of the instrument panel 12, and the airbag 42 inflates toward the upward side and the vehicle rearward side from the aperture 52. The airbag 42 inflating from the aperture 52 is supported from the vehicle forward side by the forward support surface 34 provided at the upper wall portion 24. This forward support surface 34 is inclined such that the normal line thereof turns to the downward side further toward the vehicle rearward side. Accordingly, the gas jetted out from the inflator 40 interferes with the forward support surface 34 via the airbag 42 and the airbag door 30, and the flow of the gas may be turned to the vehicle rearward side (the passenger side). As a result, the airbag 42 may be rapidly inflated and expanded toward the passenger side.

Figure 3:
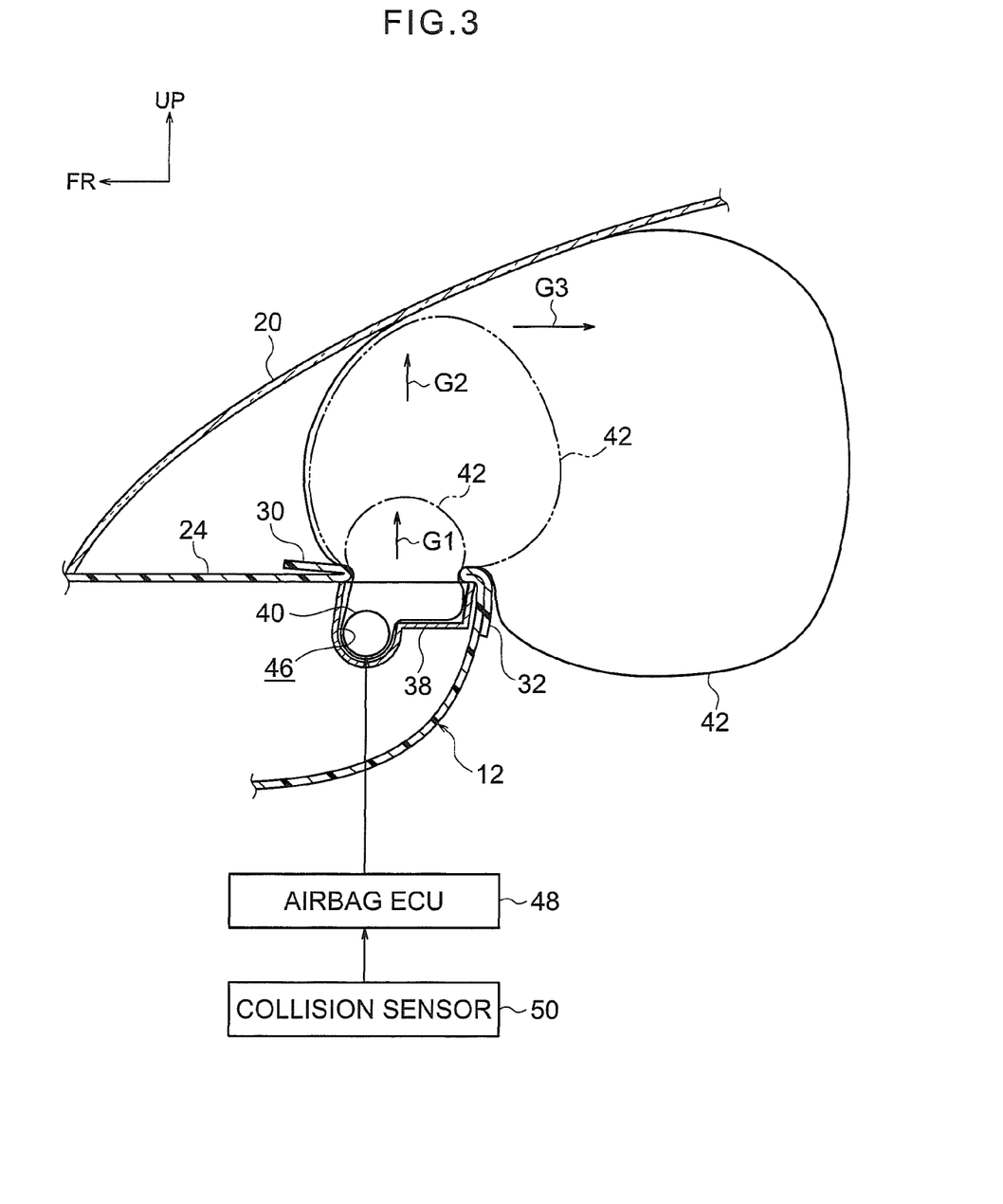
FIG. 3 is a side sectional diagram, corresponding to FIG. 2, that shows the structure of a Comparative Example of the same airbag device for a front passenger's seat.

That is, in a case in which the forward support surface 34 is not provided at the instrument panel 12, as in the Comparative Example shown in FIG. 3, the gas jetted out from the inflator 40 flows to the upward side (see arrow G1 and arrow G2 in FIG. 3). Thus, the airbag 42 inflates to the upward side until the airbag 42 abuts against the windshield 20 (see the one-dot chain line and two-dot chain line in FIG. 3). Then the flow of the gas is turned toward the vehicle rearward side (see arrow G3 in FIG. 3) by the airbag 42 abutting against the windshield 20, and the airbag 42 inflates and expands toward the vehicle rearward side. By contrast, in the present exemplary embodiment, the direction of the gas may be turned to the vehicle rearward side without any interaction with the windshield 20, so the airbag 42 may be inflated and expanded toward the passenger side rapidly.

Further, in the present exemplary embodiment, because the airbag 42 is supported by the forward support surface 34, an amount by which the airbag 42 is pushed in to the vehicle forward side when restraining a passenger may be reduced. Moreover, because inflation of the airbag 42 to the vehicle forward side may be suppressed, the volume of the airbag may be reduced, and an expansion speed of the airbag 42 may be increased.

Figure 4:
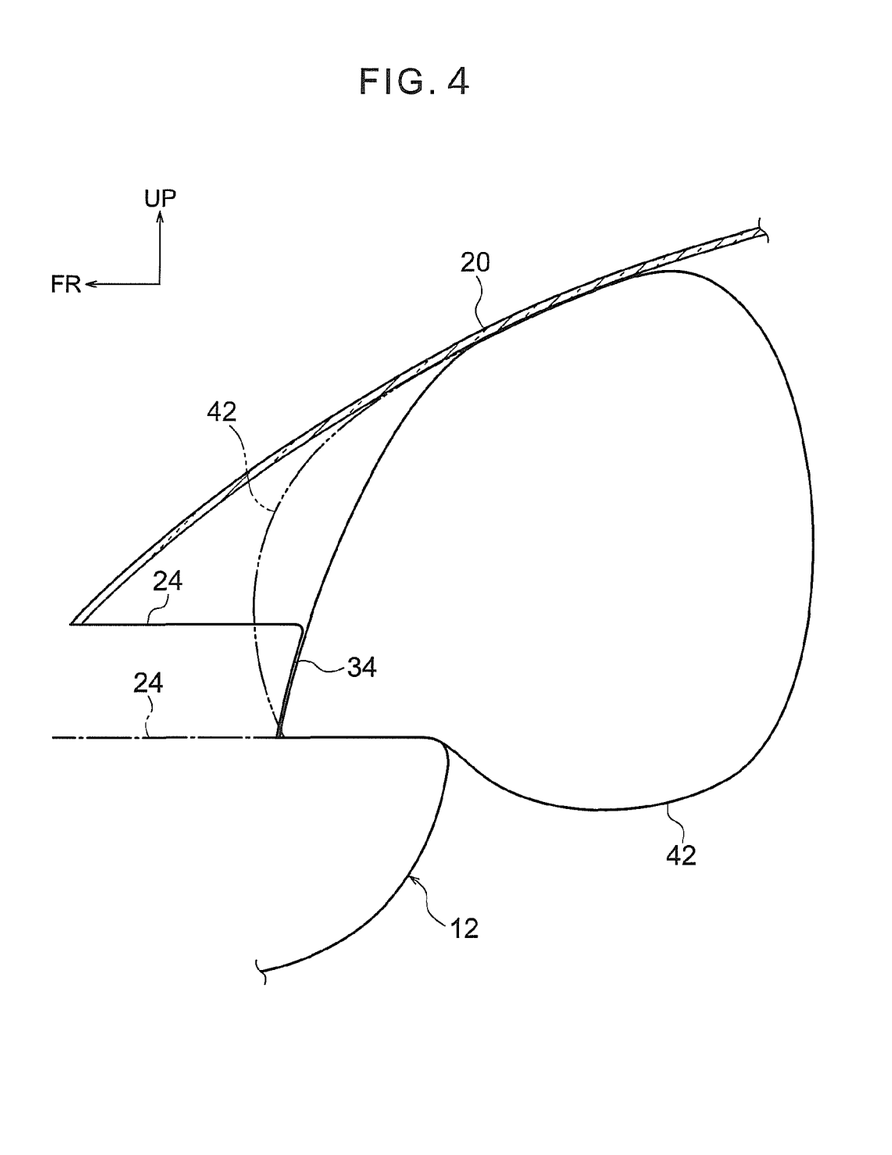
FIG. 4 is a schematic diagram for comparing the inflated and expanded state of the airbag of the same airbag device for a front passenger's seat with the inflated and expanded state of the airbag of the Comparative Example, in states viewed from the vehicle width direction.

That is, in the case in which the forward support surface 34 is not provided at the instrument panel 12, the airbag 42 expands to the vehicle forward side as shown by the two-dot chain line in FIG. 4. However, in the present exemplary embodiment, the inflation of the airbag 42 toward the vehicle forward side is suppressed as shown by the solid line in FIG. 4. Therefore, the volume of the airbag may be reduced.

Due thereto, in the present exemplary embodiment, passenger restraint performance by the airbag 42 may be made excellent even though the installation position of the top mount-type airbag module 14 is low.

Further, in the present exemplary embodiment, the upper wall portion 24 of the instrument panel 12 is formed in the stepped shape, and the display 26 is disposed on the upper face of the lower step wall portion 24B. Thus, a novel appearance is presented. In addition, because the forward support surface 34 that supports the airbag 42 is provided at the inclined wall portion 24C connecting the upper step wall portion 24A with the lower step wall portion 24B, there is no need to specify a particular shape for the upper wall portion 24 in order to provide the forward support surface 34, which is favorable.

Further, in the present exemplary embodiment, the sideward support surface 36 that is inclined such that the normal line thereof turns to the downward side further toward the vehicle width direction inner side is provided at the side door 16 of the door trim 18, and the airbag 42 inflating from the aperture 52 is supported from the vehicle width direction outer side by the sideward support surface 36. Therefore, support of the airbag 42 when restraining a passenger may be made even more stable. In particular, when a vehicle width direction outer side portion relative to a front side member of the vehicle collides with a collision object (when there is a "small overlap crash"), the upper body of the passenger moves diagonally forward due to inertia in association with a displacement to the vehicle width direction outer side, and the airbag 42 may slant in the direction of movement of the passenger. However, with the present invention this slanting of the airbag may be suppressed.

Moreover, inflation of the airbag 42 to the vehicle width direction outer side may be suppressed by the airbag 42 being supported by the sideward support surface 36. Thus, the volume of the airbag 42 may be made even smaller, which contributes to rapid inflation and expansion of the airbag 42.

Figure 5:
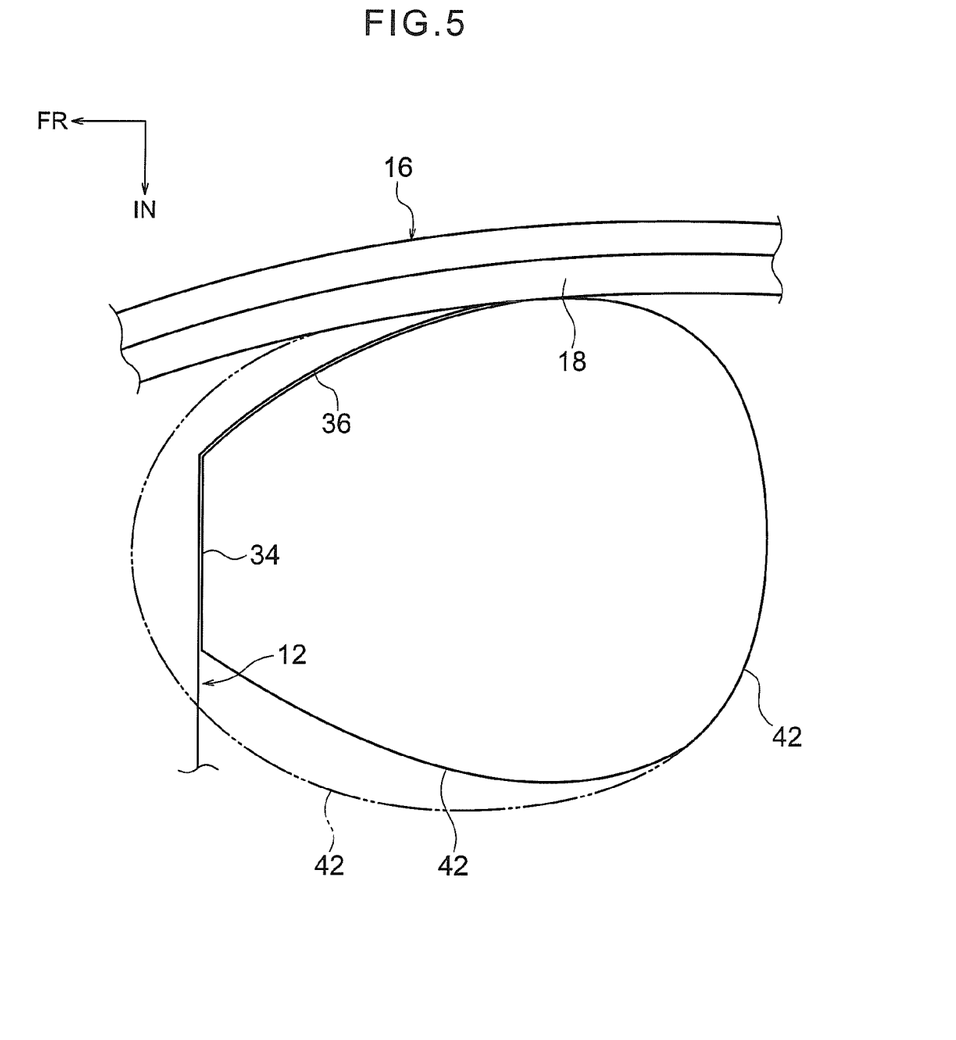
FIG. 5 is a schematic diagram for comparing the inflated and expanded state of the airbag of the same airbag device for a front passenger's seat with the inflated and expanded state of the airbag of the Comparative Example, in states viewed from the upper side.

In FIG. 5, an inflation and expansion state of the airbag 42 when the forward support surface 34 and the sideward support surface 36 are provided is shown by the solid line, and an inflation and expansion state of the airbag 42 in the case in which the forward support surface 34 and the sideward support surface 36 are not provided is shown by the two-dot chain line. As shown in FIG. 5, compared with the case in which the sideward support surface 36 is not provided, inflation of the airbag 42 toward the vehicle width direction outer side may be suppressed when the sideward support surface 36 is provided.

Further, in the present exemplary embodiment, the forward support surface 34 is inclined such that the normal line thereof turns to the downward side further toward the vehicle rearward side, and is curved so as to form a shape projecting toward the vehicle forward side as viewed from the vehicle width direction. Therefore, the gas interferes with the forward support surface 34 via the airbag 42, and may be excellently guided toward the vehicle rearward side by the forward support surface 34. Furthermore, because the forward support surface 34 is formed so as to follow the outer profile of the airbag 42 in the inflation and expansion completed state, the volume of this airbag 42 that is supported by the forward support surface 34 may be effectively reduced.

Further, in the present exemplary embodiment, the sideward support surface 36 is inclined such that the normal line thereof turns to the downward side further toward the vehicle width direction inner side, and is curved so as to form a shape projecting toward the vehicle width direction outer side as viewed from the vehicle front-and-rear direction. Thus, the sideward support surface 36 is formed so as to follow the outer profile of the airbag 42 in the inflation and expansion completed state. Therefore, the volume of this airbag 42 that is supported by the sideward support surface 36 may be effectively reduced.

Supplementary Descriptions of the Exemplary Embodiment

The exemplary embodiment described above has a structure in which the forward support surface 34 is provided at the upper wall portion 24 of the instrument panel 12. However, the invention according to claim 6 is not limited thus and may have a structure in which the forward support surface is omitted. In this case too, operational effects as described above can be provided by the provision of the sideward support surface 36.

Further, the exemplary embodiment described above has a structure in which the sideward support surface 36 is inclined such that the normal line thereof turns to the downward side further toward the vehicle width direction inner side, and is curved so as to form a shape projecting toward the vehicle width direction outer side as viewed from the vehicle front-and-rear direction. However, the inventions according to claim 3 and claim 6 are not limited thus and may have structures in which the sideward support surface is formed to be parallel with the vehicle up-and-down direction.

Further, the exemplary embodiment described above has a structure in which the forward support surface 34 is curved so as to form a projection toward the vehicle forward side as viewed from the vehicle width direction. However, the inventions according to claims 1 to 3 are not limited thus and may have structures in which the forward support surface is formed in a flat shape.

Further, the exemplary embodiment described above has a structure in which the sideward support surface 36 is provided only at the door trim 18 of the side door 16. However, the inventions according to claim 3 and claim 6 are not limited thus and may have structures in which a front portion of the sideward support surface is provided at the instrument panel and a rear portion of the sideward support surface is provided at the door trim of the side door. Furthermore, the inventions relating to claim 1 and claim 2 may have structures in which the sideward support surface is omitted.

Further, the exemplary embodiment described above has a structure in which the forward support surface 34 is provided at the upper wall portion 24 by the upper wall portion 24 of the instrument panel 12 being formed in the stepped shape. However, the invention relating to claim 1 is not limited thus. For example, a structure is possible in which the rear face of the airbag door 30 at the front side (the face thereof that faces to the downward side at usual times) serves as the forward support surface, and opening of the airbag door 30 to the forward side is restricted with respect to a position at which the forward support surface is inclined such that the normal line thereof turns to the downward side further toward the vehicle rearward side.

Further, the exemplary embodiment described above has a structure in which the forward support surface 34 is provided integrally with the upper wall portion 24. However, the invention relating to claim 1 is not limited thus and may have a structure in which the forward support surface is provided at a member that is attached to a main body portion of the upper wall portion to structure a portion of the upper wall portion. The same applies to relationships between the sideward support surface of claim 3 and claim 6 and the instrument panel and the door trim.

It will be clear that numerous modes may be embodied within a scope that does not deviate from the gist of the present invention. It will also be clear that the scope of the present invention is not to be limited to the exemplary embodiment described above.

What is claimed is:

1. An airbag device for a front passenger's seat, comprising:
    an airbag module that is provided in front of a front passenger's seat of a vehicle, the airbag module inflating and expanding an airbag with gas that is jetted out by an inflator; and
    an instrument panel that includes an upper wall portion that covers the airbag module from an upper side thereof, the airbag inflating toward an upward side and a vehicle rearward side from an aperture that is formed in the upper wall portion by opening of an airbag door by inflation pressure of the airbag, and a forward support surface being provided at the upper wall portion, which forward support surface supports the airbag inflating from the aperture from a vehicle forward side thereof at an exterior of the aperture and the forward support surface is inclined such that a normal line of the forward support surface turns to a downward side further toward the vehicle rearward side.

2. The airbag device for a front passenger's seat of claim 1, wherein the upper wall portion is formed in a stepped shape in which an upper step wall portion at the vehicle forward side and a lower step wall portion at the vehicle rearward side are joined by an inclined wall portion, and the forward support surface is provided at the inclined wall portion.

3. The airbag device for a front passenger's seat of claim 2, further comprising a sideward support surface that is provided at at least one of the instrument panel or a door trim of a side door, the sideward support surface supporting the airbag inflating from the aperture from a vehicle width direction outer side thereof.

4. The airbag device for a front passenger's seat of claim 3, wherein the sideward support surface is inclined such that a normal line thereof turns to a downward side further toward a vehicle width direction inner side, is curved so as to form a shape projecting to the vehicle width direction outer side as viewed from a vehicle front-and-rear direction, and is formed so as to follow an outer profile of the airbag in a state in which inflation and expansion is complete.

5. The airbag device for a front passenger's seat of claim 4, wherein the forward support surface is curved so as to form a shape projecting to the vehicle forward side as viewed from the vehicle width direction, and is formed so as to follow the outer profile of the airbag in the state in which inflation and expansion is complete.

6. The airbag device for a front passenger's seat of claim 3, wherein the forward support surface is curved so as to form a shape projecting to the vehicle forward side as viewed from the vehicle width direction, and is formed so as to follow an outer profile of the airbag in a state in which inflation and expansion is complete.

7. The airbag device for a front passenger's seat of claim 2, wherein the forward support surface is curved so as to form a shape projecting to the vehicle forward side as viewed from a vehicle width direction, and is formed so as to follow an outer profile of the airbag in a state in which inflation and expansion is complete.

8. The airbag device for a front passenger's seat of claim 1, further comprising a sideward support surface that is provided at at least one of the instrument panel or a door trim of a side door, the sideward support surface supporting the airbag inflating from the aperture from a vehicle width direction outer side thereof.

9. The airbag device for a front passenger's seat of claim 8, wherein the sideward support surface is inclined such that a normal line thereof turns to a downward side further toward a vehicle width direction inner side, is curved so as to form a shape projecting to the vehicle width direction outer side as viewed from a vehicle front-and-rear direction, and is formed so as to follow an outer profile of the airbag in a state in which inflation and expansion is complete.

10. The airbag device for a front passenger's seat of claim 9, wherein the forward support surface is curved so as to form a shape projecting to the vehicle forward side as viewed from the vehicle width direction, and is formed so as to follow the outer profile of the airbag in the state in which inflation and expansion is complete.

11. The airbag device for a front passenger's seat of claim 8, wherein the forward support surface is curved so as to form a shape projecting to the vehicle forward side as viewed from the vehicle width direction, and is formed so as to follow an outer profile of the airbag in a state in which inflation and expansion is complete.

12. The airbag device for a front passenger's seat of claim 1, wherein the forward support surface is curved so as to form a shape projecting to the vehicle forward side as viewed from a vehicle width direction, and is formed so as to follow an outer profile of the airbag in a state in which inflation and expansion is complete.

13. The airbag device for a front passenger's seat of claim 1, wherein the air bag door has a pair of doors respectively formed at the front and rear of a tear line, and the front side door abuts the forward support surface when the front side door opens.

14. The airbag device for a front passenger's seat of claim 1, wherein the inflator is disposed below the forward support surface, when viewed from the vehicle width direction, at a portion where the inflator overlaps with the forward support surface in the vehicle front-and-rear direction.

15. The airbag device for a front passenger's seat of claim 1, wherein upon inflation of the airbag a portion of the airbag door is positioned between the inflated airbag and the forward support surface.

16. An airbag device for a front passenger's seat, comprising:
- an airbag module that is provided in front of a front passenger's seat of a vehicle, the airbag module inflating and expanding an airbag with gas that is jetted out by an inflator;
- an instrument panel that includes an upper wall portion that covers the airbag module from an upper side thereof, the airbag inflating toward an upward side and a vehicle rearward side from an aperture that is formed in the upper wall portion by opening of an airbag door by inflation pressure of the airbag; and
- a sideward support surface that is provided at at least one of the instrument panel or a door trim of a side door, the sideward support surface supporting the airbag inflating from the aperture from a vehicle width direction outer side thereof.

17. The airbag device for a front passenger's seat of claim 16, wherein the sideward support surface is inclined such that a normal line thereof turns to a downward side further toward a vehicle width direction inner side, is curved so as to form a shape projecting to the vehicle width direction outer side as viewed from a vehicle front-and-rear direction, and is formed so as to follow an outer profile of the airbag in a state in which inflation and expansion is complete.

\* \* \* \* \*